March 26, 1929.   A. B. WARREN   1,706,641
GRAIN STALK LIFTER AND GUARD FOR TRACTORS
Filed Dec. 22, 1923
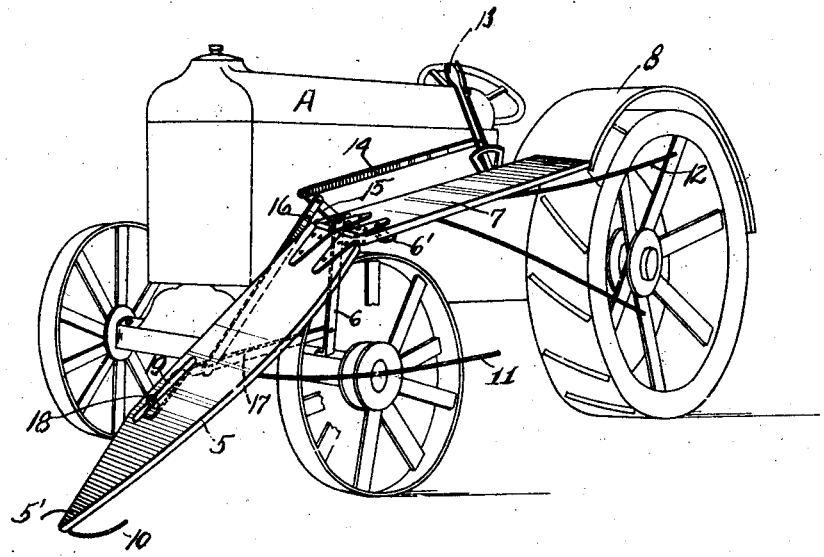
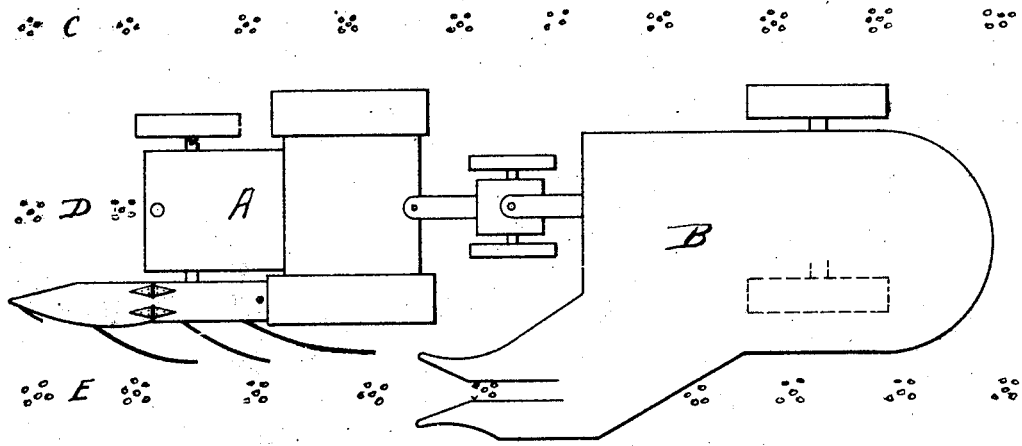
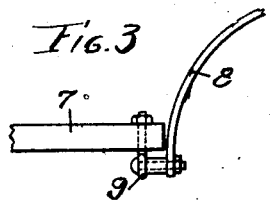
Inventor.
Albert B. Warren.
By George E. Mueller
Atty.

Patented Mar. 26, 1929.

1,706,641

UNITED STATES PATENT OFFICE.

ALBERT B. WARREN, OF LELAND, ILLINOIS, ASSIGNOR TO JOHN S. WARREN, OF LELAND, ILLINOIS.

GRAIN-STALK LIFTER AND GUARD FOR TRACTORS.

Application filed December 22, 1923. Serial No. 682,230.

My invention relates to grain stalk lifters and guards for tractors, and has to do more particularly with the provision of such a device adapted to be applied to a tractor so as to pick up the fallen grain stalks, push them so as to clear the wheels of the tractor and hold them in vertical position to be operated upon by the machine drawn by the tractor.

My invention is adapted for general use in connection with tractors and machines adapted for operating upon grain of various kinds, but in the ensuing description I shall refer more particularly to its use in connection with corn.

It frequently happens that the corn stalks in the fields, and of course other grain stalks too, after the corn has matured and before it is harvested, will fall over to the side out of the vertical position, or they may be blown over or driven over from rain and hailstorms. With the fields in such condition, that is, the corn stalks leaning over at various angles, in drawing the picker and husker by a tractor, the fallen stalks are either run over by, or get into the wheels of, the tractor, resulting in damage to the corn. Also this frequently presses the stalks down or out of position so that they cannot be gathered up and operated upon by the picker and husker.

To overcome this to some extent it has been the practice heretofore to draw the picker and husker by means of an offset hitch so that the tractor is running over rows that have been husked, with the machine one or two rows over operating upon an unhusked row. Such an offset pull, however, requires a great deal more power. On account of the side drag of the machine, the greater the offset the greater the drag and the greater the pull required.

To overcome these difficulties I have provided a guard extending in advance of the front wheel of the tractor, shaped to lift the fallen grain stalks into an upright position to clear the wheel of the tractor, so that the tractor may be hitched for a direct pull on the picker and at the same time place the fallen stalks so that they will not be damaged by the tractor, and readily gathered by the picker.

For a better understanding of my invention, reference is to be had to the accompanying drawing, in which—

Fig. 1 is a perspective view showing my invention applied to a tractor of well known make;

Fig. 2 is a schematic view showing a tractor pulling a corn picker and husker with my invention applied thereto; and Fig. 3 is a detail view of a portion of the guard, showing the pivotal connection to the rear wheel.

Referring now more in detail to the preferred form of my invention as illustrated herein, I provide a guard which extends in advance of a front wheel of the tractor comprising an arm in the form of a board 5 pivotally attached to a board 7 fastened to the top arm 6' of a bracket 6 secured to the front axle of the tractor. The guard board 5 has a gathering point 5' which has a yielding rest and side guard arm 10 secured thereto. The top board 7 is pivotally secured at its rear end to the fender 8 by means of an eye and bolt connection 9, as shown in Fig. 3, so that the support 7 may tilt with the movement of the machine and not be held rigid. The guard boards 5 and 7 are preferably shaped and positioned so that they cover the wheels of the tractor, but in order to more positively but yieldingly support the lifted stalks I provide on the members 5 and 6 extensions as 11 and 12 in the form of spring metal rods, which also act to keep the shorter stalks and lower leaves, etc. clear of the wheels.

In the operation of the guard it is, of course, kept down close to the ground while the tractor is moving forwardly between the rows of corn. In turning or moving the machine it is desirable to raise the guard clear of the ground so as to avoid the hills or projections, and to this end I provide the hinged construction so that the front board 5 may be raised by the hand lever 13. This lever 13 is connected to the front board 5 through a link 14 pivotally connected to the upper end of link 15, the lower end of which is pivotally connected to the bracket 6. A link 16 extends from link 15 to link 17, which latter link is pivotally connected to bracket 6 and has a laterally extending arm carrying a sliding extension 18 passing through a slot 19 in the board 5. Thus when the lever 13 is pulled backwardly by the driver, it will raise the point of board 5 to any desired position, where it is held through the rack mechanism of the lever 13. Thus the operator may readily control the guard from his seat on the tractor and raise and lower it as required.

In the operation of my invention, and assuming that the tractor A is hitched for a direct pull to the picker and husker B, by the provision of my invention the tractor may advance over a row of corn as D adjacent the row E which is being operated upon. As the apparatus moves down the row the fallen stalks are picked up by the point 5' of the gathering board 5 and raised into a vertical position by coming in contact with the side of board 5 and then the arms as 11 and 12. Thus the stalks are lifted clear of the wheels of the tractor and are held so that they may readily enter between the gathering points of the following machine, where they pass up through the usual gathering chains and then into the snapper and husker.

It will be apparent that without my invention applied to the tractor A, the fallen corn stalks, or whatever grain stalks are being operated upon, will lie in the path of the wheels of the tractor, where they will be crushed and the corn damaged or the stalks crushed so that they cannot be picked up by the gathering points of the following machine.

As previously stated, heretofore this has been overcome by connecting the tractor A to the machine B through an offset hitch so that the tractor is set two rows to one side, as row C. In this case, of course, both rows C and D have been operated upon. Thus with the tractor A advancing along row C and the picker points over row E, the tractor is far enough to one side not to pass over the fallen corn of row E. But such an arrangement requires a tractor of considerable power, as the side drag of the machine B with the offset hitch is considerable and particularly when the fields are anything but dry.

I have overcome these difficulties by applying my improved guard to the tractor so that a direct pull may be made, and furthermore I am enabled to use a tractor of considerably less power than what has heretofore been necessary with the offset pull.

What I claim as new and desire to secure by United States Letters Patent is:

1. A stalk lifter and guard for vehicles comprising a support to be secured to one side of the vehicle at the forward end thereof, a long stalk-lifting arm pivotally connected to the support above the front wheel of the axle and extending downwardly and forwardly with a lifting nose close to the ground, a substantially horizontal support extending from the front wheel to the rear wheel of the vehicle, and a plurality of suitably supported resilient rods extending longitudinally alongside the vehicle on the outside of the lifting arm and support to maintain the lifted stalks in a vertical position.

2. A stalk lifter and guide for attachment to one side of a tractor and comprising an inclined arm extending in advance of a front wheel of the tractor from a point close to the ground upwardly and backwardly over the wheel and having a pointed nose and flared side so as to pass under and lift fallen corn stalks into an upright position to the outside and clear of the wheel, and a horizontally positioned guide extending from the front arm outside of the wheel and rearwardly to hold and guide the lifted stalks between the gathering points of a corn picker.

3. A stalk lifter and holder comprising a support adapted to be positioned over a front wheel of a tractor, a board having its rear end pivotally secured to the support and inclined forwardly and downwardly to a position in advance of said front wheel and narrowing down to a pointed end at the front, a substantially horizontally disposed board extending from the support over the front wheel to the rear wheel of the tractor, a manually operable lever supported alongside the driver's seat of the tractor, and link connections extending from said lever to the front board for raising and lowering it on its pivot.

4. A stalk lifter and guard comprising a long stalk lifting arm to be arranged at an incline in advance of the front wheel of a vehicle and extend to a point adjacent to the ground from a point above the wheel, a horizontal guiding arm arranged contiguous with the upper end of the lifting arm and extending from the front to the rear wheel to guide the stalks between the points of a picker.

5. In a stalk lifter and guard attachment for tractors, a pair of contiguous longitudinal members to be supported at one side of the tractor with one of such members disposed at an incline in advance of the front tractor wheel to lift the stalks to a vertical position clear of the wheel as the tractor moves over the ground, and the other extending horizontally between the front and rear wheels to hold and guide the stalks in a rearward direction to one side of the tractor.

6. A stalk lifter and guard attachment for tractors comprising a horizontal stalk-guiding arm to bridge the space between the front and rear wheels of one side of the tractor, a stalk-lifting arm pivoted at the forward end of the stalk-guiding arm and normally extending downwardly over the front wheel at an oblique angle whereby to gradually lift the stalks onto the guiding arm as the tractor moves in a longitudinal direction, and means for raising the arm to render the attachment inoperative at will.

7. The combination with a tractor adapted to draw a corn picker, of an auxiliary corn stalk lifter for removing the stalks from in front of the tractor and thereby permitting the corn picker to be hitched directly in back of the tractor, said corn stalk lifter comprising a substantially horizontal support positioned between the front and rear wheels of the tractor and in a position above said front wheel, an inclined stalk engaging member pivoted to the front end of said horizontal support with its lower end pointed to engage under the stalks and with its outside edge provided with a parabolic curve for moving the stalks away from the tractor as they are lifted, and means operable from a position adjacent the seat of the tractor driver for swinging said inclined member about its pivot to raise or lower the stalk engaging end.

In witness whereof, I hereunto subscribe my name this 11th day of December, A. D. 1923.

ALBERT B. WARREN.